United States Patent
Mennenga et al.

(10) Patent No.: US 7,190,713 B2
(45) Date of Patent: Mar. 13, 2007

(54) PHASE ERROR CORRECTION USING DESPREAD SIGNALS

(75) Inventors: Menno Mennenga, Dresden (DE); Erich Sachse, Dresden (DE); Thomas Hanusch, Coswig (DE)

(73) Assignee: Advanced Micro Devices, Inc., Sunnyvale, CA (US)

( * ) Notice: Subject to any disclaimer, the term of this patent is extended or adjusted under 35 U.S.C. 154(b) by 887 days.

(21) Appl. No.: 10/284,641

(22) Filed: Oct. 31, 2002

(65) Prior Publication Data
US 2003/0223479 A1    Dec. 4, 2003

(30) Foreign Application Priority Data
May 31, 2002    (DE) ............... 102 24 165

(51) Int. Cl.
  H04B 1/69    (2006.01)
  H04B 7/216   (2006.01)
(52) U.S. Cl. ............... 375/152; 375/371; 370/206
(58) Field of Classification Search ........... 375/149, 375/150, 152, 332, 335, 371; 370/206, 335
See application file for complete search history.

(56) References Cited

U.S. PATENT DOCUMENTS

| | | | | |
|---|---|---|---|---|
| 5,666,352 A * | 9/1997 | Ohgoshi et al. | ............ | 370/206 |
| 5,943,329 A * | 8/1999 | Ohgoshi et al. | ............ | 370/335 |
| 6,028,888 A * | 2/2000 | Roux | ............ | 375/148 |
| 6,134,260 A * | 10/2000 | Bottomley et al. | ......... | 375/130 |
| 6,292,477 B1 * | 9/2001 | Ohgoshi et al. | ............ | 370/335 |
| 6,456,609 B2 * | 9/2002 | Ohgoshi et al. | ............ | 370/335 |
| 6,650,187 B1 * | 11/2003 | Riddle et al. | ............... | 331/17 |
| 6,661,834 B1 | 12/2003 | Shan et al. | | |
| 6,697,415 B1 | 2/2004 | Mahany | | |
| 7,027,538 B2 * | 4/2006 | Ghosh | ............ | 375/350 |

(Continued)

FOREIGN PATENT DOCUMENTS

EP    1 087 582    3/2001

(Continued)

OTHER PUBLICATIONS

International Search Report; PCT/US 03/06150; Mailed Jul. 31 2003.

(Continued)

*Primary Examiner*—Emmanuel Bayard
*Assistant Examiner*—Lawrence Williams
(74) *Attorney, Agent, or Firm*—Meyertons Hood Kivlin Kowert & Goetzel, P.C.; B. Noël Kivlin

(57) ABSTRACT

A phase error correction technique in receivers such as WLAN receivers is provided. Such receivers comprise a phase error correction unit connected to receive an input signal having a phase error and adapted to generate an output signal having a corrected phase error. Further, the receiver comprises a despreader which is adapted to despread a data signal. The despreader is connected to the phase error correction unit to provide the despread data signal to the phase error correction unit. The phase error correction unit is arranged for correcting the phase error dependent on the despread data signal. The despreader may be a Barker matched filter or a CCK matched filter, and there may be provided a multiplexer for selecting one of the filters.

41 Claims, 3 Drawing Sheets

U.S. PATENT DOCUMENTS

2004/0086062 A1* 5/2004 Eckhardt et al. ............ 375/343

FOREIGN PATENT DOCUMENTS

| EP | 1 187 412 | 3/2002 |
| WO | 01/50631 | 7/2001 |

OTHER PUBLICATIONS

International Search Report; PCT/US 03/06150; Mailed Feb. 4, 2004.

Translation of Office Action, 102 24 165.1-31, Aug. 5, 2005.

* cited by examiner

PHASE ERROR CORRECTION USING DESPREAD SIGNALS

BACKGROUND OF THE INVENTION

1. Field of the Invention

The invention generally relates to receivers in spread spectrum communications systems such as WLAN (Wireless Local Area Network) systems, and in particular to the phase error correction of received signals.

2. Description of the Related Art

A Wireless Local Area Network is a flexible data communications system implemented as an extension to or as an alternative for, a wired LAN. Using radio frequency or infrared technology, WLAN devices transmit and receive data over the air, minimizing the need of wired connections. Thus, WLAN systems combine interconnectivity with user mobility.

Most WLAN systems use spread spectrum technology, a wide-band radio frequency technique developed for use in reliable and secure communications systems. The spread spectrum technology is designed to trade-off bandwidth efficiency for reliability, integrity and security. Two types of spread spectrum radio systems are frequently used: frequency hopping and direct sequence systems.

The standard defining and governing wireless local area networks that operate in the 2.4 GHz spectrum, is the IEEE 802.11 standard. To allow higher data rate transmissions, the standard was extended to the 802.11b standard that allows data rates of 5.5 and 11 Mbps in the 2.4 GHz spectrum. This extension is backwards compatible as far as it relates to direct sequence spread spectrum technology, but it adopts a new modulation technique called CCK (Complementary Code Keying) which allows the speed increase.

In WLAN systems as well as in other spread spectrum communication systems, the signal on its way from the transmitter to the receiver experiences several distortions. A frequency error may result from a frequency offset of the radio frequency oscillators at the transmitter and the receiver.

Assuming s(t) to be the transmitted signal $$s(t) = A(t) \cdot e^{j\omega t}$$

where $\omega$ is the carrier frequency, the received signal can be described as $$r(t) = B(t) \cdot e^{j[(\omega + \omega_e)t + \phi_e(t)]}$$

where $\omega_e$ is the oscillator frequency difference between receiver and transmitter, and $\phi_e$ is the difference in oscillator phase between the receiver and the transmitter.

Turning now to FIG. 1, an error correction arrangement is schematically shown consisting of a frequency error correction unit 100 and a phase error correction unit 110. The frequency error correction unit 100 is used to compensate for the frequency difference, and the phase error correction unit 110 will then compensate for the residual phase error. This will now be described in more detail.

Assuming the baseband signal input to the frequency error correction unit 100 be given as $$B(t) \cdot e^{j(\omega_e t + \phi_0)}$$

the output signal of the frequency error correction unit 100 will be $$B(t) \cdot e^{j(\tilde{\omega}_e t + \phi_0)}$$

where $\tilde{\omega}_e$ denotes the residual frequency error. This signal can be considered a signal with time dependent phase $$\phi_e(t) = \tilde{\omega}_e t + \phi_0$$

which will linearly progress in time, as $\tilde{\omega}_e$ and $\phi_0$ are constant values.

The phase error correction unit 110 has now the task to remove the remaining phase error such that the received signal is as close as possible to the transmitted signal, to minimize the probability of demodulation errors. An example of how the phase error correction unit 110 may operate is depicted in FIG. 2.

The phase error correction unit shown in FIG. 2 includes an error correction module 200 that performs the following operation:

$$B(t) \cdot e^{j\phi_e(t)} \cdot e^{-j\tilde{\phi}_e(t)} = B(t) \cdot e^{j[\phi_e(t) - \tilde{\phi}_e(t)]}$$

where $\tilde{\phi}_e(t)$ is the current estimate of the phase error. The error correction module 200 is controlled by means of an error signal received from the measurement module 210. The measurement module 210 measures the phase error of the output signal of the correction module 200 and tries to generate the error signal so as to minimize the phase difference $\phi_e(t) - \tilde{\phi}_e(t)$.

Turning now to FIG. 3, the state diagram (or constellation diagram) for a BPSK (Binary Phase Shift Keying) system is shown. The diagram has been rotated for explanatory reasons. In the diagram, the hollow symbols represent the "ideal" signal points whereas the cross mark represents the signal point of the received signal which is phase offset. The current phase difference between the ideal and the received constellation point is given by $\Delta\tilde{\phi}_e(t)$. It is the task of the error measurement module 210 to determine this phase difference to generate the error signal as precise as possible.

Let x(k),x(k−1),x(k−2), . . . be the real parts of the received data samples, and y(k),y(k−1),y(k−2), . . . the respective imaginary parts, and let the real and imaginary parts of the ideal constellation point be given by $x_A$ and $y_A$, respectively, the phase error can then be calculated according to $$\Delta\tilde{\phi}_e(t) = \arctan\left(\frac{y_A}{x_A}\right) - \arctan\left(\frac{y(t)}{x(t)}\right)$$

$$t = \{T, 2T, 3T, \ldots\}$$

$$T = \frac{1}{11} \text{ MHz}$$

However, there is always an additive white Gaussian noise in the received signal so that the measured signal point will deviate from the cross mark shown in FIG. 3 randomly. To illustrate this, there is shown in FIG. 3 a range around the cross mark indicating the region where the measured constellation points will be randomly distributed with a certain probability, due to the additive noise. The region is shown to have a certain radius, and this radius will depend on the current channel conditions in the communication system.

Thus, measuring the phase difference as shown above has the disadvantage that due to the additive noise, there will be a random measurement error. The greater the radius of the noise region, the greater will be the measurement error. It is to be noted that the measurement error may be up to 100% if the distance between the ideal signal point and the received signal point, i.e. the cross mark, in the constellation diagram does not exceed the radius of the noise region.

Evidently, the measurement module 210 cannot accurately generate an error signal if the phase difference cannot be measured precisely. Thus, the phase error correction in conventional receivers often operate insufficiently, leading to reduced reliability of the overall system, and reducing the settling time of the receiver.

SUMMARY OF THE INVENTION

An improved receiver and operation method are provided having increased control quality when performing a phase error correction, in particular in case of noisy data samples.

According to one embodiment, a WLAN receiver is provided that comprises a phase error correction unit that is connected to receive an input signal having a phase error and that is adapted to generate an output signal having a corrected phase error. The WLAN receiver further comprises a despreader that is adapted to despread a data signal. The despreader is connected to the phase error correction unit to provide the despread data signal to the phase error correction unit. The phase error correction unit is arranged for correcting the phase error dependent on the despread data signal.

In another embodiment, a receiver in a spread spectrum communications system is provided. The receiver comprises a phase error correction unit connected to receive an input signal having a phase error and adapted to generate an output signal having a corrected phase error. The receiver further comprises a despreader that is adapted to despread a data signal. The despreader is connected to the phase error correction unit to provide the despread data signal to the phase error correction unit. The phase error correction unit is arranged for correcting the phase error dependent on the despreader data signal.

In yet another embodiment, there may be provided an integrated circuit chip for processing spread spectrum data signals. The integrated circuit chip comprises phase error correction circuitry adapted to correct a phase error in an input signal, and despreader circuitry adapted to despread a data signal. The despreader circuitry is connected to the phase error correction circuitry to provide the despread data signal to the phase error correction circuitry. The phase error correction circuitry is arranged for correcting the phase error dependent on the despread data signal.

In a further embodiment, a method of operating a WLAN receiver is provided. The method comprises correcting a phase error in an input signal, and despreading a data signal. The phase error correction is performed dependent on the despread data signal.

In still a further embodiment, there is provided a method of operating a receiver in a spread spectrum communications system. The method comprises correcting a phase error in an input signal, and despreading a data signal. The phase error correction is performed dependent on the despread data signal.

BRIEF DESCRIPTION OF THE DRAWINGS

The accompanying drawings are incorporated into and form a part of the specification for the purpose of explaining the principles of the invention. The drawings are not to be construed as limiting the invention to only the illustrated and described examples of how the invention can be made and used. Further features and advantages will become apparent from the following and more particular description of the invention, as illustrated in the accompanying drawings, wherein.

DETAILED DESCRIPTION OF THE INVENTION

The illustrative embodiments of the present invention will be described with reference to the figure drawings wherein like elements and structures are indicated by like reference numbers.

Figure 1:
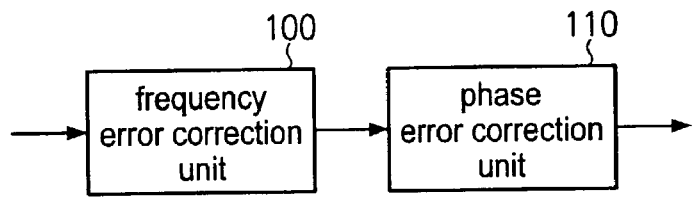
FIG. 1 is a schematic block diagram illustrating components in a conventional receiver, used for correcting a frequency and phase error.
Figure 2:
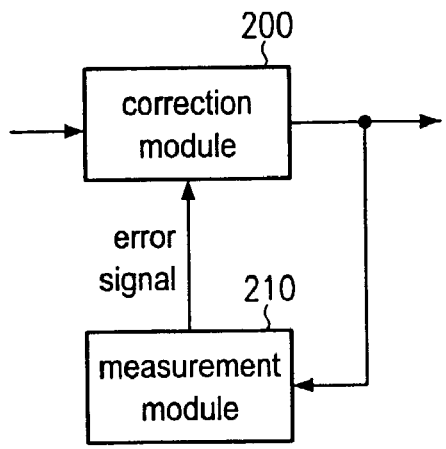
FIG. 2 illustrates the main components of a conventional phase error correction unit.
Figure 3:
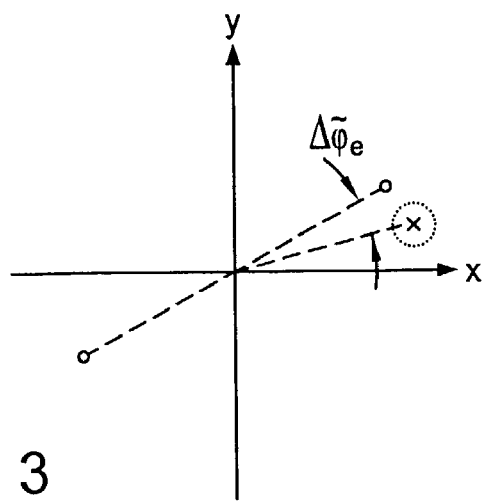
FIG. 3 is a phase constellation diagram showing ideal and received signal points.
Figure 4:
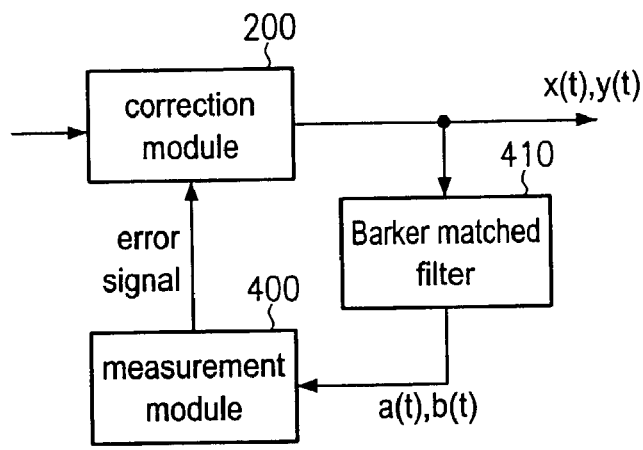
FIG. 4 is a block diagram of a phase error correction arrangement according to a first embodiment.

Turning now to the drawings, and in particular to FIG. 4 which illustrates components of a WLAN receiver according to a first embodiment, a phase error correction unit 200, 400 is provided including an error correction module 200 and a measurement module 400. The measurement module 400 issues an error signal to the correction module 200 where the error signal is used to correct the phase error. Thus, the construction of the phase error correction unit according to the first embodiment is similar to that of FIG. 2 but it is to be noted that the measurement module 400 may be different. This is because the measurement module 400 is connected to receive an output of the Barker matched filter 410, so that the measurement module 400 needs to be adapted to generate the error signal on the basis of the despread data signal that is output from the Barker matched filter 410.

Assuming that the Barker matched filter 410 receives the time dependent real and imaginary parts of the received data sample, i.e. x(t) and y(t), the Barker matched filter 410 will generate the following output:

$$\begin{aligned}
a(t) = &-1 \cdot x(t-10T) & b(t) = &-1 \cdot y(t-10T) \\
&-1 \cdot x(t-9T) & &-1 \cdot y(t-9T) \\
&-1 \cdot x(t-8T) & &-1 \cdot y(t-8T) \\
&+1 \cdot x(t-7T) & &+1 \cdot y(t-7T) \\
&+1 \cdot x(t-6T) & &+1 \cdot y(t-6T) \\
&+1 \cdot x(t-5T) & &+1 \cdot y(t-5T) \\
&-1 \cdot x(t-4T) & &-1 \cdot y(t-4T) \\
&-1 \cdot x(t-3T) & &-1 \cdot y(t-3T) \\
&+1 \cdot x(t-2T) & &+1 \cdot y(t-2T) \\
&+1 \cdot x(t-1T) & &+1 \cdot y(t-1T) \\
&-1 \cdot x(t) & &-1 \cdot y(t)
\end{aligned}$$

The measurement module 400 will then generate the error signal according to:

$$\Delta\tilde{\varphi}_e(t) = \begin{cases} \arctan\left(\frac{y_A}{x_A}\right) - \arctan\left(\frac{b(t)}{a(t)}\right) & \text{for } t = n \cdot 11 \cdot T, n = \text{integer}, T = \frac{1}{11} \text{ MHz} \\ \Delta\tilde{\varphi}_e(t-1) & \text{otherwise} \end{cases}$$

It is to be noted that the output of the Barker matched filter 410 will depend at any time not only on the real and imaginary parts of the currently received data sample but also on the respective values of up to ten previous data samples. Thus, the influence of the additive white noise will be averaged so that the measurement module 400 may generate the error signal with greater precision. This allows for better controlling the quality of the phase error correction compared with conventional, sample-based schemes. Moreover, substantially no additional circuitry is needed for this purpose since a Barker matched filter 410 is usually already present in the receiver.

Figure 5:
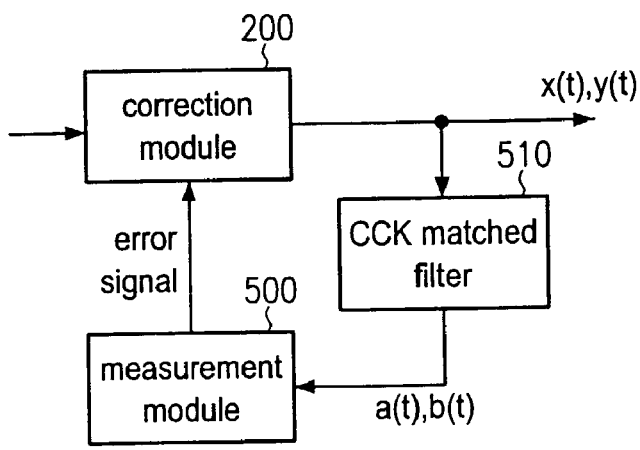
FIG. 5 is a block diagram of a phase error correction arrangement according to a second embodiment.

Turning now to FIG. 5, a second embodiment is illustrated that differs from the first embodiment in that the Barker matched filter 410 is replaced with a CCK matched filter 510. As mentioned above, CCK is a modulation technique implemented in the IEEE 802.11b standard for allowing data rates of 5.5 and 11 Mbps. The CCK modulation can generally be described as a modification of MOK (M-ary Orthogonal Keying) modulation using codes of a complex symbol structure. The CCK technology allows for multichannel operation and employs the same chip rate and spectrum shape as the 802.11 Barker code spread functions. CCK can be considered as a form of M-ary codeword modulation where one of M unique signal codewords is chosen for transmission.

Thus, while the first embodiment uses a Barker matched filter 410 and is therefore best suited for correcting the phase errors in 802.11 compliant WLAN systems, or in 1 or 2 Mbps modes of 802.11b compliant WLAN receivers, the technique of the second embodiment shown in FIG. 5 may be best used in 5.5 and 11 Mbps modes of 802.11b compliant receivers.

The CCK matched filter 510 may be implemented using a Walsh tree. The Walsh tree may consist of a CCK correlator and a CCK comparator, and may use a soft decision maximum likelihood decoding. The comparator is used to find the local maximum. In the present embodiment, the despread signal which is output by the CCK matched filter 510 and provided to the measurement module 500, is the phase output of a CCK decorrelator.

It is to be noted that the arrangement of the second embodiment may achieve the same advantages as the first embodiment. That is, the Gaussian noise will be suppressed because by using a despread signal, the signal is raised from the noise floor. By avoiding a sample-based phase error correction, the measurement of the phase difference as well as the correction of the phase error may be performed more precisely. This reduces demodulation errors and leads to a better overall performance of the WLAN receiver.

Figure 6:
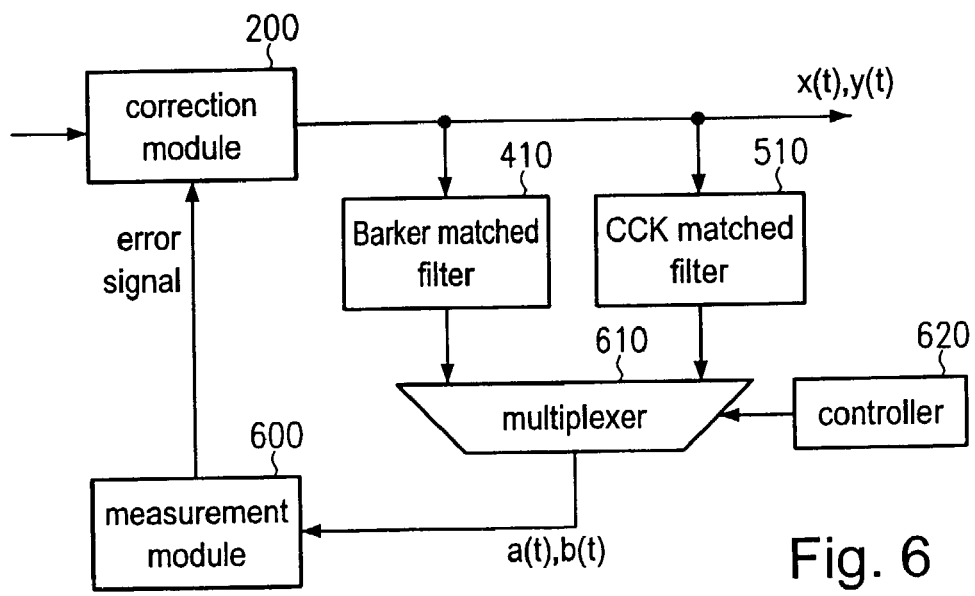
FIG. 6 is a block diagram of a phase error correction arrangement according to a third embodiment.

Turning now to FIG. 6, a third embodiment is illustrated that may achieve the above advantages in any possible data transfer mode of the receiver. A multiplexer 610 is provided acting as a selection unit for selecting one of the Barker matched filter 410 and the CCK matched filter 510 dependent on the current transfer mode, i.e. on the data rate. The multiplexer 610 receives a selection signal from a controller 620 which keeps track of the modes so that the arrangement can switch from one filter to the other in case the data rate changes, e.g. from 2 to 5.5 Mbps.

In the above embodiments, the measurement modules 400, 500, 600 may be adapted to integrate the phase difference to achieve an estimate of the current phase error:

$$\tilde{\phi}_e(t) = a \cdot \tilde{\phi}_e(t-1) + b \cdot \Delta\tilde{\phi}_e(t)$$

where a and b are constants. Integration may be done using a low-pass filter, and the term integration as used herein may include any smoothing algorithm that averages over a given period of time, or calculates a weighted sum of a previously smoothed value and a current value. These techniques may even more suppress an influencing additive white noise.

Figure 7:
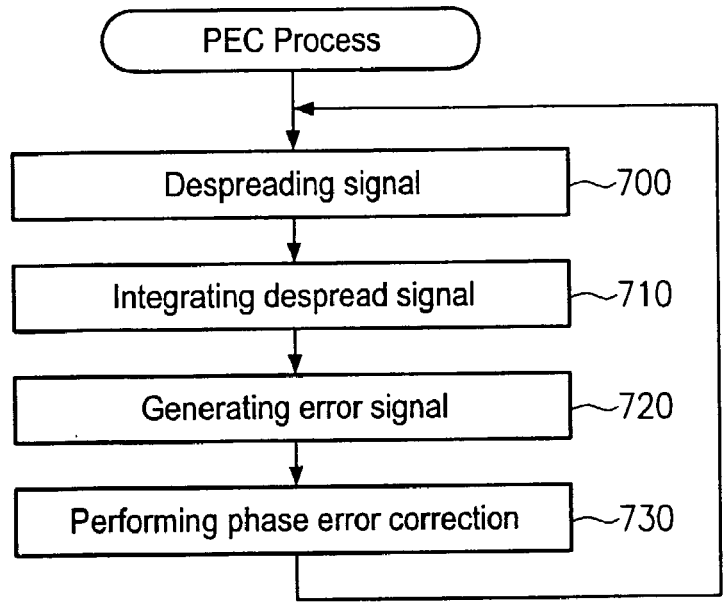
FIG. 7 is a flowchart illustrating the process of operating the arrangement according to one of the embodiments.

Turning to now to FIG. 7, a flowchart is shown illustrating the main process of operating the arrangements of one of the above discussed embodiments. In step 700, the received data signal is despread using either the Barker matched filter 410 or the CCK matched filter 510. It is to be noted that any other kind of despreading (or demodulating) technique may likewise be used. The signal may best be despread using the despreader that is already present in the receiver.

The despread signal is then integrated in step 710, and an error signal is generated in step 720. It is to be noted that instead of integrating the despread signal and generating the error signal based thereon, an error signal may be generated without a preceding integration step. Moreover, in another embodiment, the error signal could be integrated.

Finally, using the generated error signal, the phase error correction is performed in step 730, and the process returns to step 700 where the output of the correction module 200 is fed to the despreader 410, 510.

Figure 8:
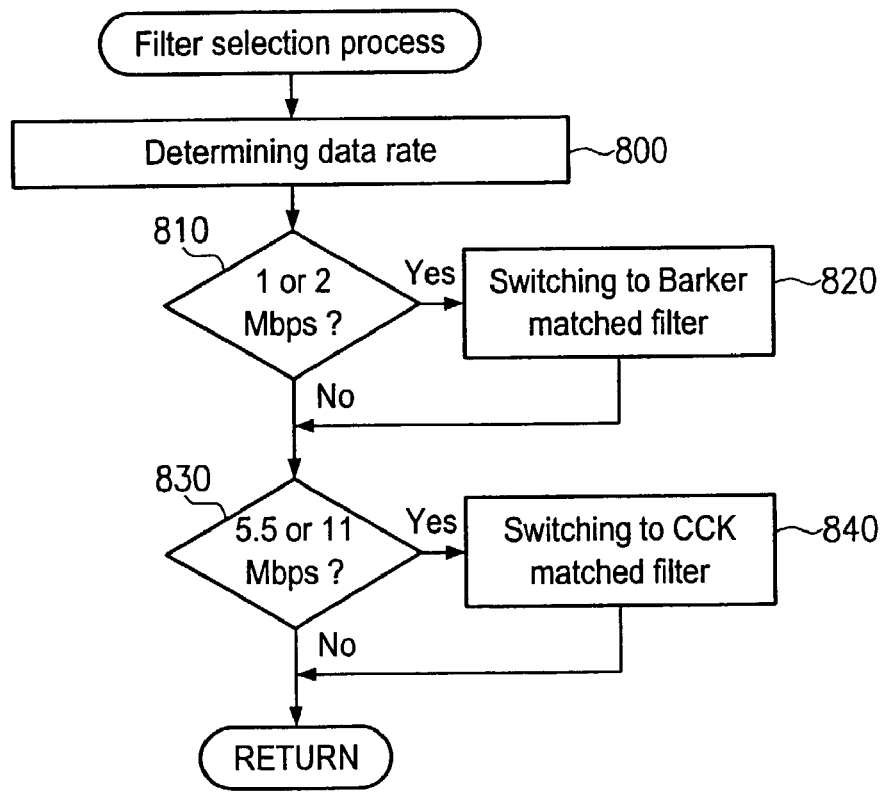
FIG. 8 is a flowchart illustrating the filter selection process performed in the arrangement according to the third embodiment.

The process of selecting one of the Barker matched filter 410 and the CCK matched filter 510 in the third embodiment is shown in FIG. 8. In step 800, the controller 620 determines the data rate. It is then checked in step 810 whether data transmission is performed in the 1 or 2 Mbps mode, and if so, the multiplexer 610 is instructed to switch to the Barker matched filter 410 (step 820). If it is determined in step 830 that data transmission is performed in the 5.5 or 11 Mbps mode, the multiplexer 610 will switched to the CCK matched filter 510 in step 840.

As apparent from the above discussion, a phase error correction technique is provided that is applicable in WLAN systems and other spread spectrum communications systems and that may improve demodulation reliability and settling time by suppressing the influence of additive noise in the received data samples. The technique may be used in particular in 802.11b compliant systems. No restriction with respect to encoding techniques apply, so that the embodiments may achieve the mentioned advantages in BPSK (Binary Phase Shift Keying), QPSK (Quadrature Phase Shift Keying) and other schemes including DQPSK (Differential QPSK).

While the invention has been described with respect to the physical embodiments constructed in accordance therewith, it will be apparent to those skilled in the art that various modifications, variations and improvements of the present invention may be made in the light of the above teachings and within the purview of the appended claims without departing from the spirit and intended scope of the invention. In addition, those areas in which it is believed that those of ordinary skill in the art are familiar, have not been described herein in order to not unnecessarily obscure the invention described herein. Accordingly, it is to be understood that the invention is not to be limited by the specific illustrative embodiments, but only by the scope of the appended claims.

What is claimed is:

1. A WLAN (Wireless Local Area Network) receiver comprising:
    a phase error correction unit connected to receive an input signal having a phase error and adapted to generate an output signal having a corrected phase error; and
    a despreader adapted to despread a data signal;
    wherein said despreader is connected to said phase error correction unit to provide the despread data signal to said phase error correction unit, and
    said phase error correction unit is arranged for correcting the phase error dependent on said despread data signal;
    wherein said despreader is connected to said phase error correction unit to receive said output signal as said data signal.

2. The WLAN receiver of claim 1, wherein said phase error correction unit comprises:
    an error measurement module connected to receive said despread data signal and adapted to generate an error signal indicative of the current phase error; and
    an error correction module connected to receive said error signal and adapted to generate said output signal.

3. The WLAN receiver of claim 2, wherein said error measurement module is adapted to integrate said despread data signal over time to generate said error signal.

4. The WLAN receiver of claim 1, wherein said despreader is a Barker matched filter.

5. The WLAN receiver of claim 1, wherein said despreader is a CCK (Complementary Code Keying) matched filter.

6. The WLAN receiver of claim 5, wherein said CCK matched filter is implemented using a Walsh tree.

7. The WLAN receiver of claim 5, wherein said CCK matched filter comprises a CCK decorrelator to provide a phase output of said CCK decorrelator to said phase error correction unit.

8. The WLAN receiver of claim 1, wherein said despreader comprises:
    a Barker matched filter;
    a CCK (Complementary Code Keying) matched filter; and
    a selection unit connected to said Barker matched filter and said CCK matched filter,
    wherein said selection unit is adapted to select one of said Barker matched filter and said CCK matched filter to provide an output of the selected filter to said phase error correction unit.

9. The WLAN receiver of claim 8, wherein said selection unit is connected to receive a selection signal indicating which one of said Barker matched filter and said CCK matched filter is to be selected.

10. The WLAN receiver of claim 9, further comprising:
    a controller adapted to generate said selection signal dependent on a data transfer mode relating to a signal currently received by said WLAN receiver.

11. The WLAN receiver of claim 10, wherein said controller is adapted to keep track of the currently used data transfer mode, and is capable of switching the selection signal in case the data transfer mode changes.

12. The WLAN receiver of claim 9, further comprising:
    a controller adapted to generate said selection signal dependent on the data rate of said data signal to be despread.

13. The WLAN receiver of claim 12, wherein said controller is adapted to generate said selection signal to instruct said selection unit to select said Barker matched filter in case of a 1 Mbps or 2 Mbps data rate.

14. The WLAN receiver of claim 12, wherein said controller is adapted to generate said selection signal to instruct said selection unit to select said CCK matched filter in case of a 5.5 Mbps or 11 Mbps data rate.

15. The WLAN receiver of claim 12, wherein said controller is adapted to keep track of the currently used data rate, and is capable of switching the selection signal in case the data rate changes.

16. The WLAN receiver of claim 1, further comprising:
    a frequency error correction unit adapted to correct a frequency error in a received signal;
    wherein said input signal of said phase error correction unit is a signal having a corrected frequency error.

17. The WLAN receiver of claim 1, being IEEE 802.11b compliant.

18. A receiver in a spread spectrum communications system, comprising:
    a phase error correction unit connected to receive an input signal having a phase error and adapted to generate an output signal having a corrected phase error; and
    a despreader adapted to despread a data signal;
    wherein said despreader is connected to said phase error correction unit to provide the despread data signal to said phase error correction unit, and
    said phase error correction unit is arranged for correcting the phase error dependent on said despread data signal;
    wherein said despreader is connected to said phase error correction unit to receive said output signal as said data signal.

19. An integrated circuit chip for processing spread spectrum data signals, comprising:
    phase error correction circuitry adapted to correct a phase error in an input signal; and
    despreader circuitry adapted to despread a data signal;
    wherein said despreader circuitry is connected to said phase error correction circuitry to provide the despread data signal to said phase error correction circuitry, and
    said phase error correction circuitry is arranged for correcting the phase error dependent on said despread data signal;
    wherein said despreader circuitry is connected to said phase error correction unit to receive said output signal as said data signal.

20. A method of operating a WLAN (Wireless Local Area Network) receiver, the method comprising:
    correcting a phase error in an input signal; and
    despreading a data signal;
    wherein the phase error correction is performed dependent on the despread data signal;
    wherein despreading the data signal comprises operating a CCK (Complementary Code Keying) matched filter; and
    wherein said CCK matched filter comprises a CCK decorrelator to provide a phase output of said CCK decorrelator, the phase error correction being performed dependent on said phase output.

21. The method of claim 20, wherein correcting the phase error comprises:
    generating an error signal based on said despread data signal, the error signal being indicative of the current phase error; and
    generating a corrected output signal based on said error signal.

22. The method of claim 21, wherein generating the error signal comprises:
integrating said despread data signal over time.

23. The method of claim 20, wherein said data signal is a signal generated by correcting the phase error of said input signal.

24. The method of claim 20, wherein said CCK matched filter is implemented using a Walsh tree.

25. A WLAN (Wireless Local Area Network) receiver comprising:
a phase error correction unit connected to receive an input signal having a phase error and adapted to generate an output signal having a corrected phase error; and
a despreader adapted to despread a data signal;
wherein said despreader is connected to said phase error correction unit to provide the despread data signal to said phase error correction unit,
wherein said phase error correction unit is arranged for correcting the phase error dependent on said despread data signal;
wherein said despreader is a CCK (Complementary Code Keying) matched filter; and
wherein said CCK matched filter comprises a CCK decorrelator to provide a phase output of said CCK decorrelator to said phase error correction unit.

26. A WLAN (Wireless Local Area Network) receiver comprising:
a phase error correction unit connected to receive an input signal having a phase error and adapted to generate an output signal having a corrected phase error; and
a despreader adapted to despread a data signal;
wherein said despreader is connected to said phase error correction unit to provide the despread data signal to said phase error correction unit, and
said phase error correction unit is arranged for correcting the phase error dependent on said despread data signal;
wherein said despreader comprises:
a Barker matched filter;
a CCK (Complementary Code Keying) matched filter; and
a selection unit connected to said Barker matched filter and said CCK matched filter,
wherein said selection unit is adapted to select one of said Barker matched filter and said CCK matched filter to provide an output of the selected filter to said phase error correction unit.

27. The WLAN receiver of claim 26, wherein said selection unit is connected to receive a selection signal indicating which one of said Barker matched filter and said CCK matched filter is to be selected.

28. The WLAN receiver of claim 27, further comprising:
a controller adapted to generate said selection signal dependent on a data transfer mode relating to a signal currently received by said WLAN receiver.

29. The WLAN receiver of claim 28, wherein said controller is adapted to keep track of the currently used data transfer mode, and is capable of switching the selection signal in case the data transfer mode changes.

30. The WLAN receiver of claim 27, further comprising:
a controller adapted to generate said selection signal dependent on the data rate of said data signal to be despread.

31. The WLAN receiver of claim 30, wherein said controller is adapted to generate said selection signal to instruct said selection unit to select said Barker matched filter in case of a 1 Mbps or 2 Mbps data rate.

32. The WLAN receiver of claim 30, wherein said controller is adapted to generate said selection signal to instruct said selection unit to select said CCK matched filter in case of a 5.5 Mbps or 11 Mbps data rate.

33. The WLAN receiver of claim 30, wherein said controller is adapted to keep track of the currently used data rate, and is capable of switching the selection signal in case the data rate changes.

34. A method of operating a WLAN (Wireless Local Area Network) receiver, the method comprising:
correcting a phase error in an input signal; and
despreading a data signal;
wherein the phase error correction is performed dependent on the despread data signal;
wherein despreading the data signal comprises:
operating a Barker matched filter;
operating a CCK (Complementary Code Keying) matched filter; and
selecting one of said Barker matched filter and said CCK matched filter,
wherein the phase error correction is performed dependent on an output of the selected filter.

35. The method of claim 34, wherein selecting one of the filters comprising:
receiving a selection signal from a controller, the selection signal indicating which one of said Barker matched filter and said CCK matched filter is to be selected.

36. The method of claim 35, further comprising:
operating said controller to generate said selection signal dependent on a data transfer mode relating to a signal currently received by said WLAN receiver.

37. The method of claim 36, wherein operating said controller comprises:
keeping track of the currently used data transfer mode; and
switching the selection signal in case the data transfer mode changes.

38. The method of claim 35, further comprising:
operating said controller to generate said selection signal dependent on the data rate of said data signal to be despread.

39. The method of claim 38, wherein operating said controller comprises:
generating said selection signal to select said Barker matched filter in case of a 1 Mbps or 2 Mbps data rate.

40. The method of claim 38, wherein operating said controller comprises:
generating said selection signal to select said CCK matched filter in case of a 5.5 Mbps or 11 Mbps data rate.

41. The method of claim 38, wherein operating said controller comprises:
keeping track of the currently used data rate; and
switching the selection signal in case the data rate changes.

* * * * *